United States Patent [19]
Aksyuk et al.

[11] Patent Number: 5,923,798
[45] Date of Patent: Jul. 13, 1999

[54] MICRO MACHINED OPTICAL SWITCH

[75] Inventors: Vladimir A. Aksyuk, Piscataway; David J. Bishop, Summit; Peter L. Gammel, Millburn, all of N.J.

[73] Assignee: Lucent Technologies, Inc., Murray Hill, N.J.

[21] Appl. No.: 08/856,569

[22] Filed: May 15, 1997

Related U.S. Application Data

[51] Int. Cl.$^6$ ............................................. G02B 6/26
[52] U.S. Cl. ................................. 385/19; 385/23; 385/20
[58] Field of Search .............................. 359/889; 385/16, 385/18, 19, 20, 21, 22, 23, 25, 140

[56] References Cited

U.S. PATENT DOCUMENTS

| | | | |
|---|---|---|---|
| 4,850,697 | 7/1989 | Schoennauer et al. | 359/889 |
| 5,052,777 | 10/1991 | Ninnis et al. | 385/19 |
| 5,311,410 | 5/1994 | Hsu et al. | 385/19 |
| 5,375,033 | 12/1994 | MacDonald | 361/281 |

FOREIGN PATENT DOCUMENTS 0 510 629 A1   10/1992   European Pat. Off. .

OTHER PUBLICATIONS

Pister et al., "Microfabricated Hinges," v. 33, Sensors and Actuators A, pp. 249–256, 1992.
H. Fujita, "Application of Micromachining Technology to Optical Devices and Systems," SPIE, vol. 2879, pp. 2–11, 1996.
Chu et al., "Dynamics of Polysilicon Parallel–Plate Electrostatic Actuators," Sensors and Actuators A, vol. 52, pp. 216–220, 1996.
Wu et al., "Integrated Devices Make an Optical Bench on a Chip," Laser Focus World, pp. 64–68, Feb. 1996.
Patent Abstracts of Japan, Pub. No. 01238605, Pub. Date Sep. 22, 1989 to Matsushita Electric Ind. Co. Ltd.
"Micromechanic Shutter Fiber–Optic Switch," IBM Technical Disclosure Bulletin, vol. 37, No. 2B, pp. 457–459, Feb. 1, 1994.
Lee et al., "Surface–Micromachined Free–Space Fibre–Optic Switches," Elec. Letts., vol. 31, No. 17, pp. 1481–1482, Aug. 17, 1995.
Magel et al., "Phosphosilicate Glass Waveguides for Phased–Array Radar Time Delay," Proc. SPIE, vol. 1703, pp. 373–378, Apr. 20, 1992.

*Primary Examiner*—Hung N. Ngo

[57] ABSTRACT

Optical switches utilizing electrostatically-driven actuators formed from micro machined plates are disclosed. Under an applied voltage, a movable plate moves toward a fixed plate or a conductive region of an underlying support. The switches further include a mechanical linkage from the actuator to an optical device. The displacement of the movable plate generated at the actuator is transferred, via the mechanical linkage, to the optical device. The optical device, which is positioned in close proximity to optically-aligned spaced optical fibers, is movable into and out of an optical path defined by the optical cores of the optical fibers by the action of the actuator. An "in-plane" optical switch includes an actuator having two vertically-oriented electrodes, which generates a substantially horizontally-directed displacement of the movable plate and the linked optical device. An "out-of-plane" optical switch includes an actuator having at least one horizontally-disposed suspended above a conductive region of an underlying support. The actuator generates a substantially vertically-directed displacement of the movable plate and the linked optical device.

20 Claims, 9 Drawing Sheets

MICRO MACHINED OPTICAL SWITCH

FIELD OF THE INVENTION

The present invention relates to an optical switch.

BACKGROUND OF THE INVENTION

Optical switches can be used to turn the light output of an optical fiber on or off, or, alternatively, to redirect the light to various different fibers, all under electronic control. Such switches can be used in a variety of different applications, including, for example, devices such as add-drop multiplexers in wavelength-division-multiplexing systems, reconfigurable networks, hot backups to vulnerable components, and the like. In those and other applications, it would be useful to have optical switches characterized by moderate speed, low insertion loss, high contrast ratio and low manufacturing cost.

Known optical switches may be categorized, generally, as belonging to one of two classes. One class may be referred to as bulk opto-mechanical switches. In such switches, an input fiber, typically engaged to a lens, is physically translatable from a first position to at least a second position. In each position, the input fiber optically connects with a different output fiber. Bulk opto-mechanical switches possess several desirable characteristics, including low cost, low insertion loss, low back-reflection, and insensitivity to polarization. Unfortunately, such opto-mechanical switches are slow, having response times within the range of 0.1 to 10 seconds.

A second type of optical switch may be referred to as an integrated-optical switch. In such switches, an input fiber is coupled to a planar waveguide, typically lithium niobate or silicon. Output fibers are connected to various output ports of the waveguide. The electro-optic effect, whereby application of a voltage to the waveguide changes the refractive index of the various regions of the waveguide, is used to change the route of an optical signal traveling through the planar waveguide. In this manner, an input signal can be switched to one of a variety of output fibers. While such switches are very fast, they are quite expensive and frequently polarization sensitive.

As such, there is a need for a low cost optical switch possessing the desirable characteristics of opto-mechanical switches, but having a much greater switching speed.

SUMMARY OF THE INVENTION

Optical switches utilizing electrostatically-driven actuators comprising hinged plates are disclosed. An "in-plane" optical switch includes an actuator comprising two vertically-oriented electrodes, and a linkage from the actuator to an optical device. One of the electrodes is movable, the other of the electrodes is fixed. The optical device is positioned in close proximity to two spaced optical fibers that are aligned to optically communicate. The optical device is movable into and out of an optical path defined by the optical cores of the optical fibers upon application of a horizontal or in-plane displacement of sufficient magnitude.

As a voltage is applied across the electrodes by a controlled voltage source, the movable electrode swings towards the fixed electrode. The substantially horizontal displacement of the movable electrode is transferred, by the linkage, to the optical device. As a result, the optical device moves horizontally or in-plane along a path that places it in, or out of, the optical path as a function of the back and forth oscillatory-type motion of the movable electrode.

An "out-of-plane" optical switch includes an actuator comprising at least one horizontally-disposed, vertically-movable electrode that is suspended over a conductive region of a support, and a linkage from the actuator to an optical device. As a voltage is applied from a controlled voltage source across the electrode and conductive region, the vertically-movable electrode moves downwardly toward the conductive region. The linkage, which is preferably a beam and pivot member configured in a teeter or seesaw fashion, transfers the vertical or out-of-plane oscillatory-type motion of the electrode to the optical device positioned between two optical fibers. The optical device moves vertically into and out of an optical path defined by the optical cores of the optical fibers as a function of the motion of the electrode.

BRIEF DESCRIPTION OF THE DRAWINGS

Further features of the invention will become more apparent from the following detailed description of specific embodiments thereof when read in conjunction with the accompanying drawings in which.

DETAILED DESCRIPTION

The present invention is directed to a micro mechanical hinged-plate actuator, and an optical switch incorporating same. Such an optical switch is useful in conjunction with a variety of optical systems, including, without limitation, packet routers, ADMs, reconfigurable networks and the like.

According to the present invention, the aforementioned hinged-plate actuator is used to move an optical device into or out of the path of an optical signal. In a first embodiment, the actuator and optical switch are configured to provide "in-plane" switching, and in a second embodiment, the actuator and optical switch are configured to provide "out-of-plane" switching. As used herein, the terms "in-plane", horizontal, "out-of-plane" and vertical reference a direction or location relative to the surface of a support upon which the optical switch resides. For example, in-plane or horizontal movement refers to movement in a direction parallel to the surface of the support.

Figure 1:
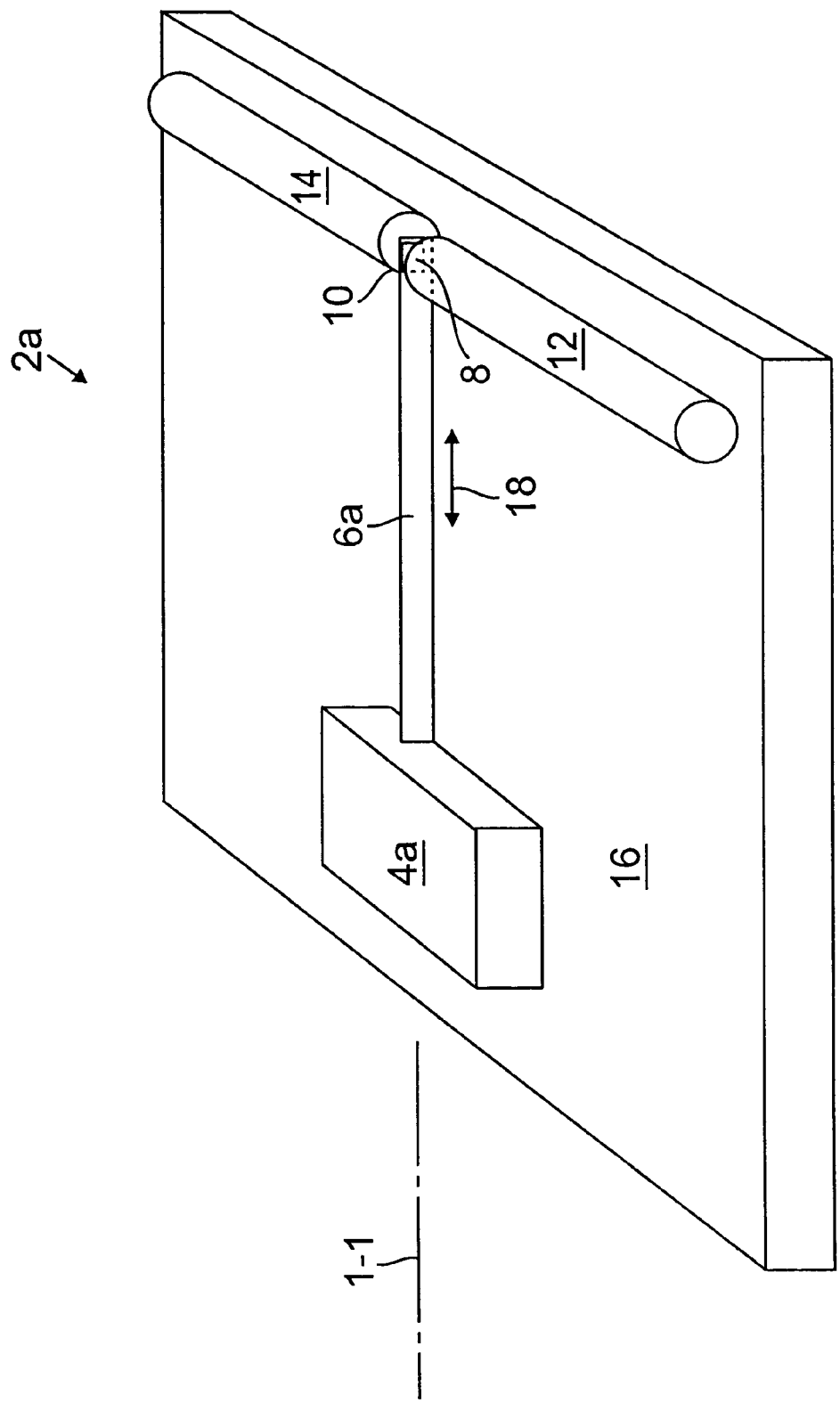
FIG. 1 shows a simplified schematic of a first exemplary embodiment of an in-plane optical switch according to the present invention.

FIG. 1 shows a simplified schematic of an exemplary embodiment of an in-plane optical switch 2a according to the present invention.

The optical switch 2a includes a hinged-plate actuator 4a, an optical device 8, and a linkage 6a. The optical switch 2a and two waveguides 12, 14 are disposed on a support 16. The linkage 6a mechanically links or interconnects the hinged-plate actuator 4a to the optical device 8. The linkage 6a is situated along an axis 1—1 passing through a gap 10 between waveguides 12 and 14. For the clarity of illustration and description, the waveguides 12, 14 are presented as optical fibers. It should be understood, however, that the present optical switch can be used in conjunction with other optical transmission media.

The linkage 6a and optical device 8 are positioned relative to the optical fibers 12, 14 so that the optical device is movable between a first position that is in the path of an optical signal traveling between the fibers, and a second position that is out of the optical path. Since, as described above, the actuator 4a imparts an in-plane motion to the linkage 6a, the optical device 8 moves horizontally back-and-forth, i.e., in a reciprocating-like motion, indicated by the direction vector 18, moving into and out of the optical path. It should be appreciated that optical switch 2a can be configured so that the optical device 8 is at the first position (in the optical path) when the actuator 4a is actuated, and at the second position (out of the optical path) when not actuated, or vice-versa.

The optical device 8 can be any one of a variety of structures suitable for affecting the optical signal in some manner. For example, the optical device 8 can be, without limitation, dielectric mirrors, dielectric filters, polarizers, attenuators and devices having a nonlinear optical response such as frequency doubler.

Figure 2:
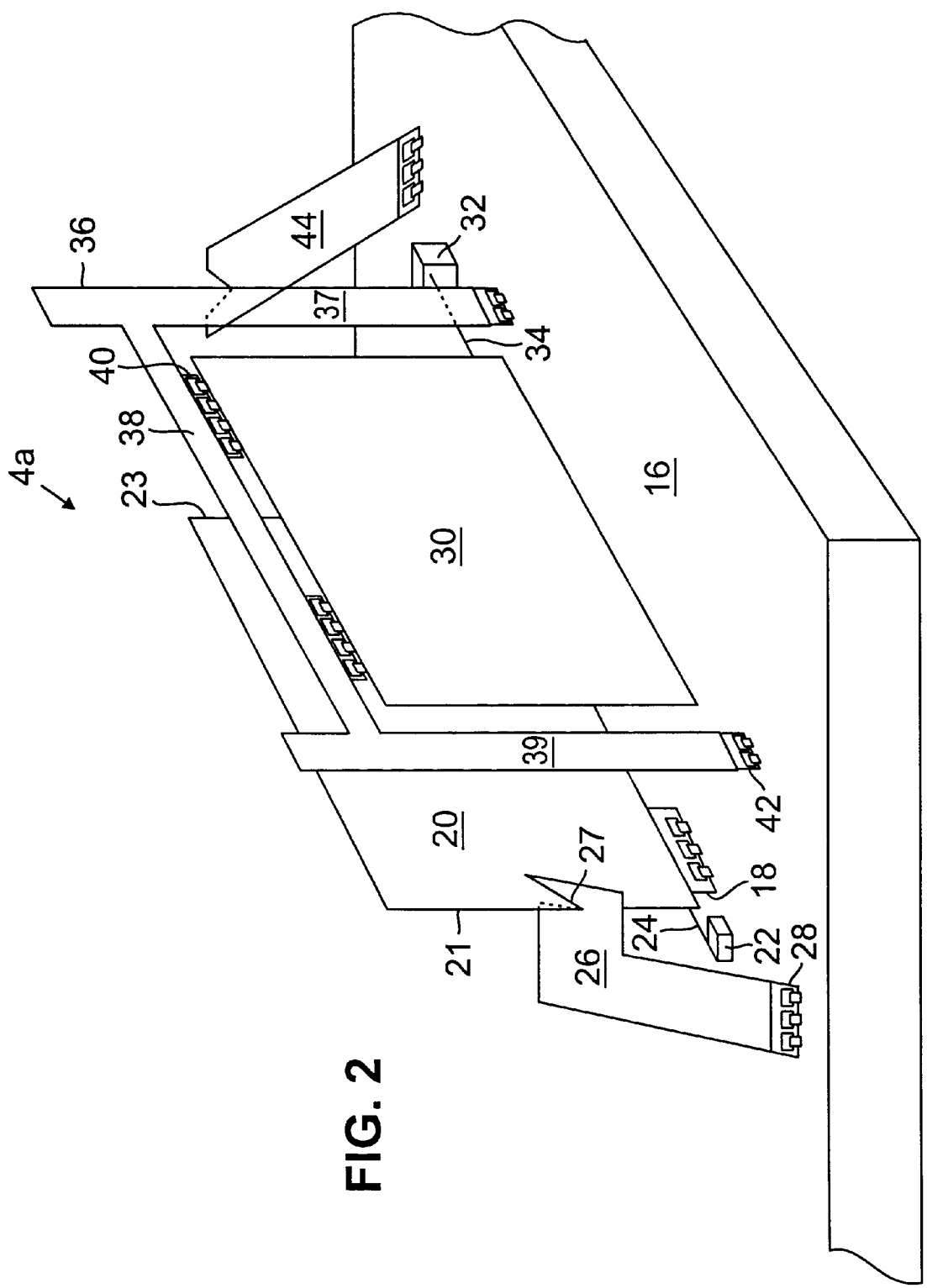
FIG. 2 shows an exemplary embodiment of an actuator suitable for actuating the switch of FIG. 1.

FIG. 2 shows an exemplary embodiment of the actuator 4a. The actuator 4a consists of a fixed electrode 20 and a movable electrode 30 that are spaced from one another. In a presently preferred embodiment, the electrodes 20, 30, as well as other elements of the optical switch 2a described below, are implemented as hinged plates. Such hinged plates are well known to those skilled in micromechanics. See, Pister et al., "Microfabricated Hinges," vol. 33, Sensors and Actuators A, pp. 249–56, 1992 incorporated by reference herein. Hinges suitable for use in the conjunction with such hinged plates are described therein, and in copending U.S. Patent Application, docket no.: Aksyuk 1-6-3, entitled METHOD AND APPARATUS FOR MAKING A MICRODEVICE, filed on even date herewith, and incorporated by reference herein.

As previously noted, the fixed electrode 20 is preferably hinged, such as by hinges 18, to the support 16. A support plate 26 is preferably used to support the fixed electrode 20 in an upright or out-of-plane position. In the illustrated embodiment, the support plate 26 receives the edge 21 of fixed electrode 20 in a notch 27. The support plate 26 is preferably hinged to the support 16 via hinges 28. In a presently preferred embodiment, a second support plate, not shown, is used in conjunction with the support plate 26, receiving edge 23 of the fixed electrode 20.

Figure 3:
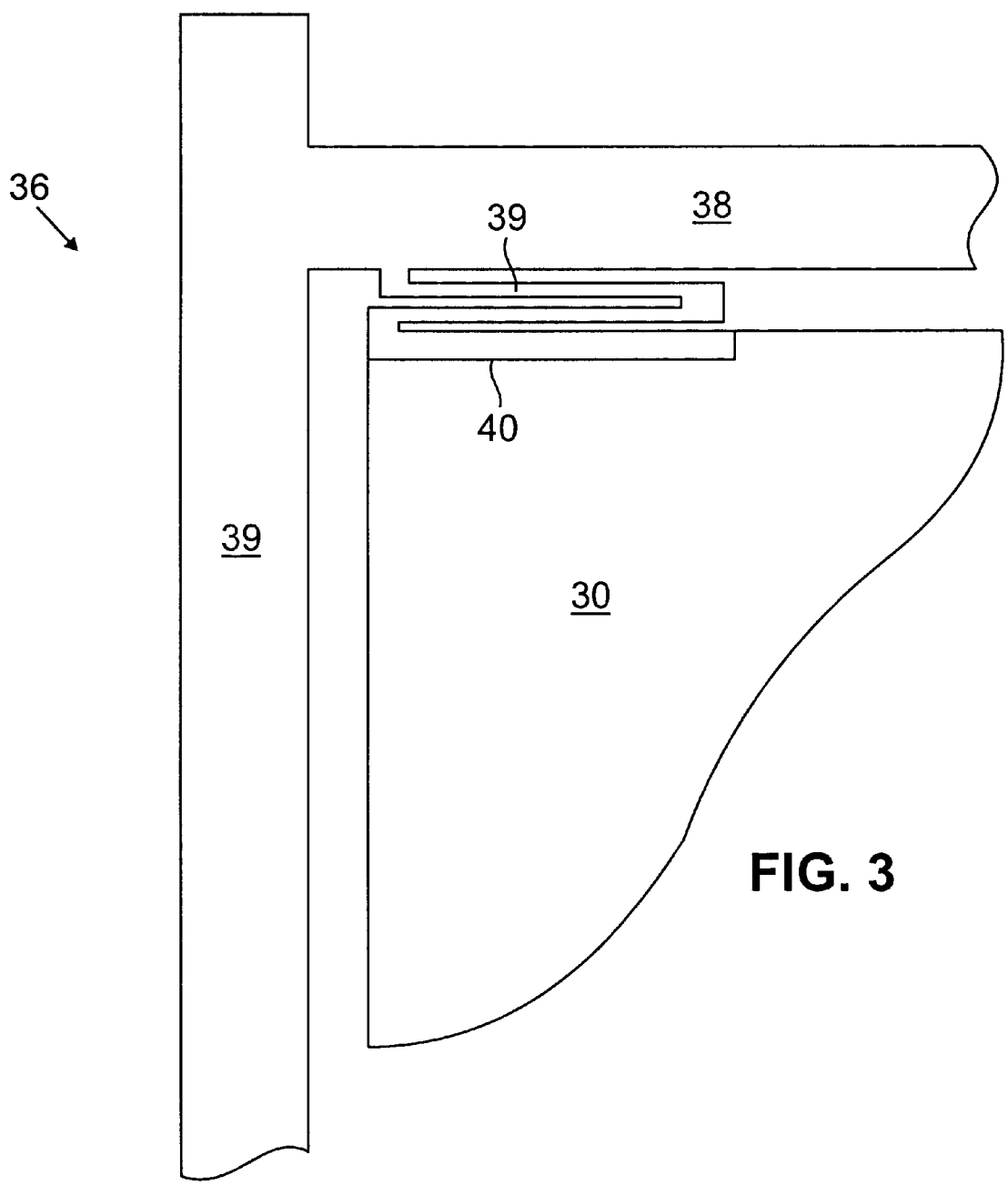
FIG. 3 shows an alternate embodiment of a suspension means for suspending the movable electrode of the actuatory of FIG. 2 from its frame.

The movable electrode 30 is suspended by suspension means 40 from cross member 38 of frame 36. The suspension means 40 is suitably configured to allow the movable electrode 30 to swing towards the fixed electrode 20. In the embodiment shown in FIG. 2, the suspension means 40 are hinges. An alternate embodiment of the suspension means 40 is illustrated in FIG. 3, which shows a partial view of the frame 36 and the movable electrode 30. The alternate embodiment of the suspension means 40 comprises a sinuous, flexible member 39. The member 39 flexes as required to allow the electrode 30 to swing towards the fixed electrode 20. Other configurations of the suspension means 40 suitable for functioning as described above may suitably be used.

The frame 36 is hinged to the support 16 by hinges 42. Preferably, a support plate 44 is used to support the frame 36 in an out-of-plane position. In the illustrated embodiment, the support plate 44 receives upright 37 of the frame 36 in a notch 46. The support plate 44 is preferably hinged to the support 16 via hinges 48. In preferred embodiments, a second support plate, not shown, is used in conjunction with the support plate 44, receiving upright 39 of the frame 36.

The fixed electrode 20 is electrically connected to a controlled voltage source, not shown, via conductor 24 and bond pad 22. In the illustrated embodiment, the movable electrode 30 is electrically connected to the controlled voltage source via conductor 34 having suitability length and flexibility, and bond pad 32. Alternatively, the bond pad 32 can be electrically connected to the frame 36 via a first conductor, and the frame 36 electrically connected to the movable electrode 30 via a second conductor. It another embodiment, suspension means 40 can provide the electrical connection between the frame 36 and the movable electrode 30.

The fixed electrode 20 and movable electrode 30 are suitably spaced so that upon application of a voltage via the controlled voltage source, an electrostatic attraction is developed between the electrodes sufficient to cause the electrode 30 to swing towards the fixed electrode 20. To prevent the electrodes 20,30 from shorting, small bumps of insulating material, not shown, can be placed on adjacent surfaces of the fixed electrode 20, the movable electrode 30 or both electrodes. The insulating material can be, for example, a dielectric, such as a glue. Preferably, such a bump of glue should have micron-sized, or sub-micron-sized dimensions. A method for delivering such a glue bump is described in a copending patent application entitled METHOD FOR FORMING MICRON-SIZED AND SMALLER LIQUID DROPLETS, attorney docket no. Aksyuk 2-7-1-4, filed on even date herewith, assigned to the present assignee and incorporated by reference herein. Alternatively, any structure suitable for preventing contact between the electrodes can suitably be used.

Figure 4:
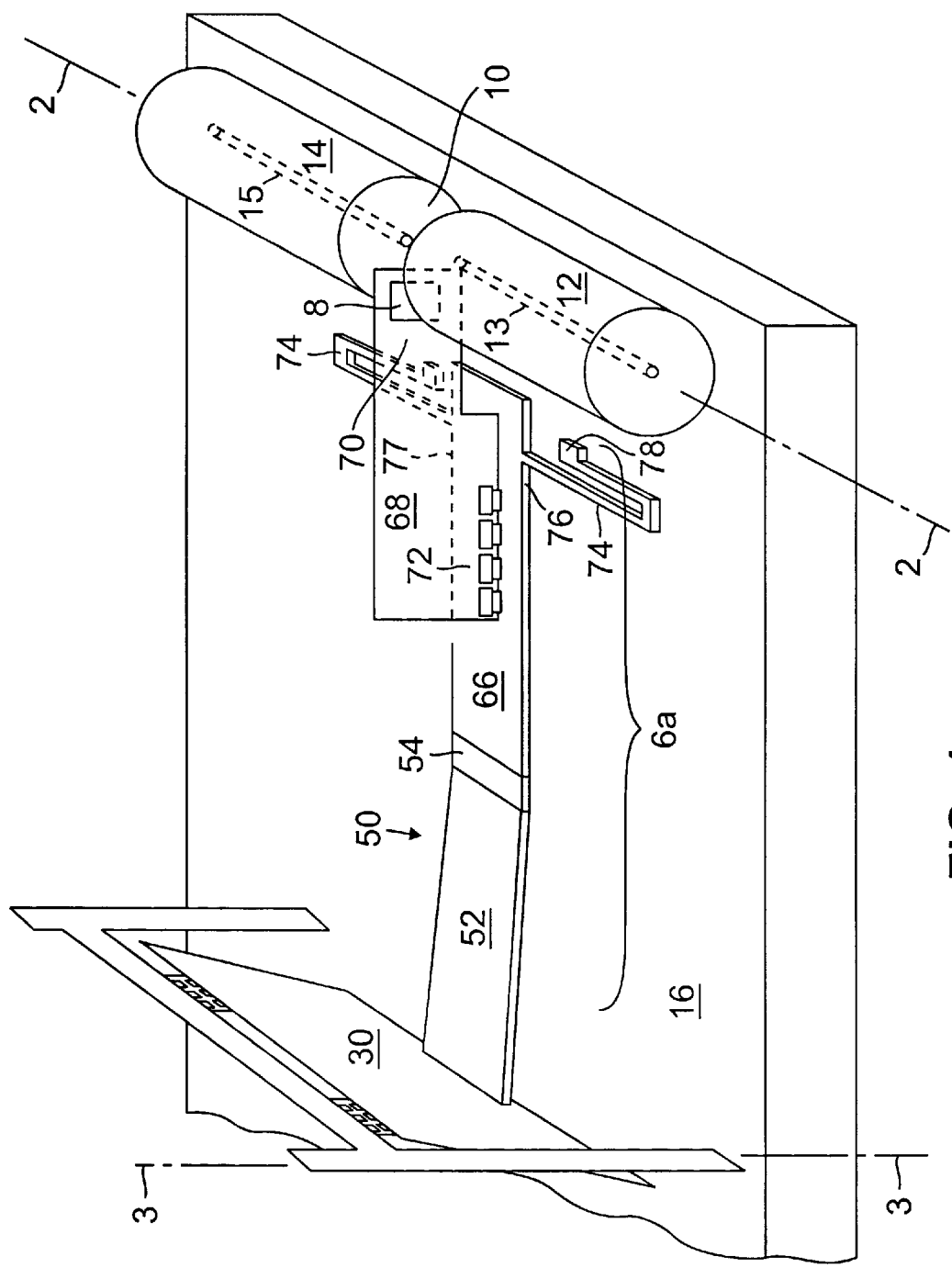
FIG. 4 shows an exemplary embodiment of a linkage that connects the actuator to the optical device.

An exemplary embodiment of the linkage 6a is shown in FIG. 4. In the embodiment shown in FIG. 4, the linkage 6a consists of a hinged sled 50 and an optical device support 68 that is hinged to the sled 50 via hinges 72. The optical device support 68 includes a projection 70 upon which the optical device 8 is disposed. A support plate, not shown, similar to support plates 26 and 44, can be attached to the sled for use in supporting the optical device support 68 in an upright out-of-plane position as required for it to project between the optical fibers 12, 14. Alternatively, glue can be used, either alone, or in conjunction with the aforementioned support plate, to fix the optical device support 68 in the out-of-plane position. Preferably, such glue is delivered according to the method described in METHOD FOR FORMING MICRON-SIZED AND SMALLER LIQUID DROPLETS, referenced above.

The sled 50 consists of a first member 52 that is linked or attached to the movable electrode 30 and a second member 66 to which the optical device support 68 is attached. In a preferred embodiment, the first and second members 52, 66 are interconnected via hinge 54. The hinge 54 functions as an out-of-plane motion decoupler. In other words, the hinge 54 allows the first member 52 to move, in an out-of-plane direction, independently of the second member 66. This ensures that the path of the optical device 8 into and out of the optical path is not affected by any out-of-plane component of motion imparted to the first member 52 as a result of the motion of the movable electrode 30 as it swings towards and away from the fixed electrode 20. An exemplary embodiment of the hinge 54 is shown in FIG. 5.

Figure 5:
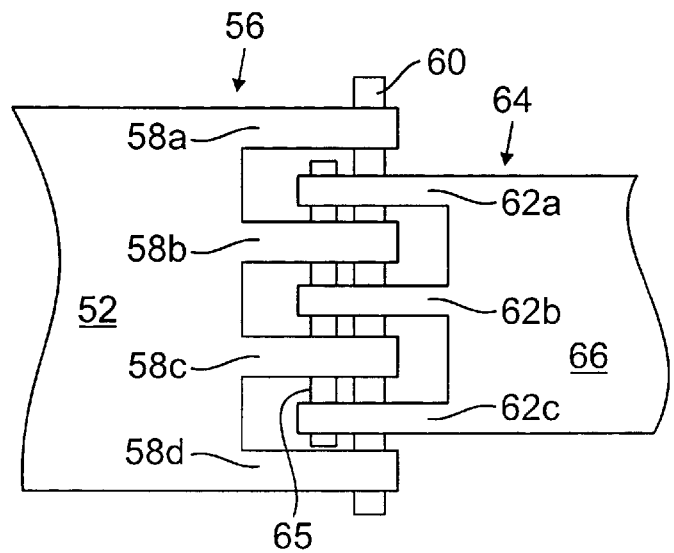
FIG. 5 shows an exemplary embodiment of a hinge for use in the exemplary linkage of FIG. 4.

In the embodiment illustrated in FIG. 5, the hinge 54 consists of interdigitated finger members 58a–d, 62a–c. Finger members 58a–d depend from end 56 of the first member 52. Each of the finger members 58a–d is attached to a bar 60. Finger members 62a–c depend from end 64 of the second member 66. Each of the finger members 62a–c are interdigitated between the finger members 58a–d and attached to a bar 65. Alternatively, multiple hinges can be used as required to withstand the stresses imparted by the actuator 4a.

It should be understood that configurations or structure other than the hinge 54 operable to decouple the out-of-plane motion of the first member 52 from the second member 66 may suitably be used.

With continuing reference to FIG. 4, the projection 70 of the optical device support 68 is situated in the space 10 between two spaced optical fibers 12, 14. When the actuator 4a is actuated, i.e., voltage is applied, the movable electrode 30 is drawn towards the fixed electrode 20. As a result, the sled 50 moves away from axis 2—2 coinciding with the optical path defined by optical cores 13 and 15, i.e., the sled moves towards the left of FIG. 4. The optical device support 68, which is attached to the sled, and the optical device 8, which is disposed on the support 68, are thereby moved out of the optical path. The actuated state, as described above, is pictured in FIG. 4.

A structure suitable for providing a restoring force, such as springs 74, are attached to edges 76, 77 of the second member 66 and attached to the substrate 16 at spring end 78. Once the actuating voltage is removed, the springs 74 provides a restoring force or bias to return the sled 50 to its unactuated position. In such a state, the movable electrode 30 hangs vertically along the axis 3—3. Referring to FIG. 4, it can be seen that in the unactuated state, the sled will move towards the axis 2—2. The spacing between the electrodes 20, 30 is set so that in the unactuated state, the optical device 68 intersects the optical path. The springs 74 also minimize any movement along the direction of the axis 2—2.

The above-described out-of-plane electrode configuration can advantageously create a large in-plane motion. The electrodes 20, 30 and hinges and various support plates can be fabricated using standard photolithographic techniques. Since the electrodes 20, 30 must be conductive, they should be formed of a conductive material, such as polysilicon, or coated with metal to impart conductivity if formed from a non-conductive material. After patterning the various hinged elements comprising the optical switch, such elements are lying flat, i.e., in-plane, on the support 16. The switch is assembled for use by lifting the free ends of the various elements so that they rotate out-of-plane. Some of the elements, such as the electrodes 20, 30 and the optical device support 68 will be oriented preferably perpendicularly to the support, while others, such as the support plates, will be rotated to some angle from the perpendicular suitable for stabilizing the perpendicularly oriented elements. In preferred embodiments, lifting members, not shown, such as thin rods, are attached to each hinged element to aid in lifting the element off the support 16.

Figure 6:
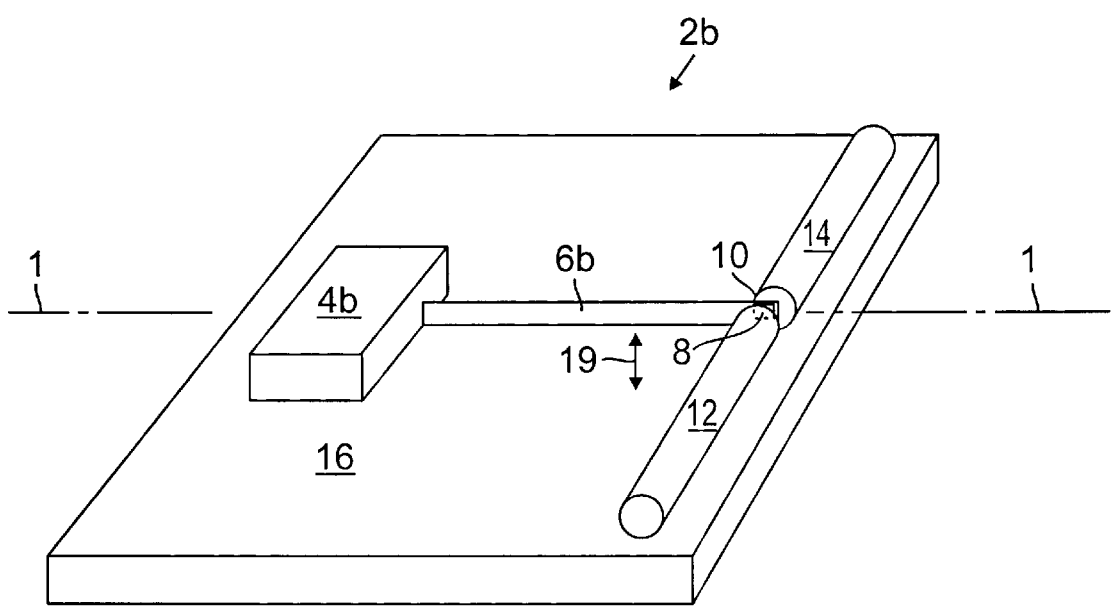
FIG. 6 shows a simplified schematic of an out-of-plane optical switch according to the present invention.

The aforedescribed optical switch 2a is characterized as an "in-plane" switch. In a further embodiment of the present invention, an out-of-plane optical switch 2b consists of an actuator 4b configured to impart out-of-plane motion, indicated by direction vector 19, to the optical device 8. FIG. 6 shows a simplified schematic of an exemplary embodiment of such an optical switch 2b.

The optical switch 2b includes a plate actuator 4b, an optical device 8, and a linkage 6b. The optical switch 2b and two optical fibers 12, 14 are disposed on a support 16. The linkage 6b mechanically links or interconnects the plate actuator 4b to the optical device 8. The linkage 6b is situated along axis 1—1 passing through gap 10 between the optical fibers.

The linkage 6b and optical device 8 are positioned relative to the waveguides 12, 14 so that the optical device is movable betweeen a first position that is in the path of an optical signal traveling between the fibers 12 and 14, and a second position that is out of the optical path. Since, as mentioned above, the actuator 4b imparts a vertical or out-of-plane motion to the linkage 6b, the optical device 8 therefore moves in a substantially "up-and-down" or vertically reciprocating motion into and out of the optical path. It should be appreciated that optical switch 2b can be configured so that the optical device 8 is at the first position (in the optical path) when the actuator 4b is actuated, and at the second position (out of the optical path) when not actuated, or vice-versa.

Figure 7:
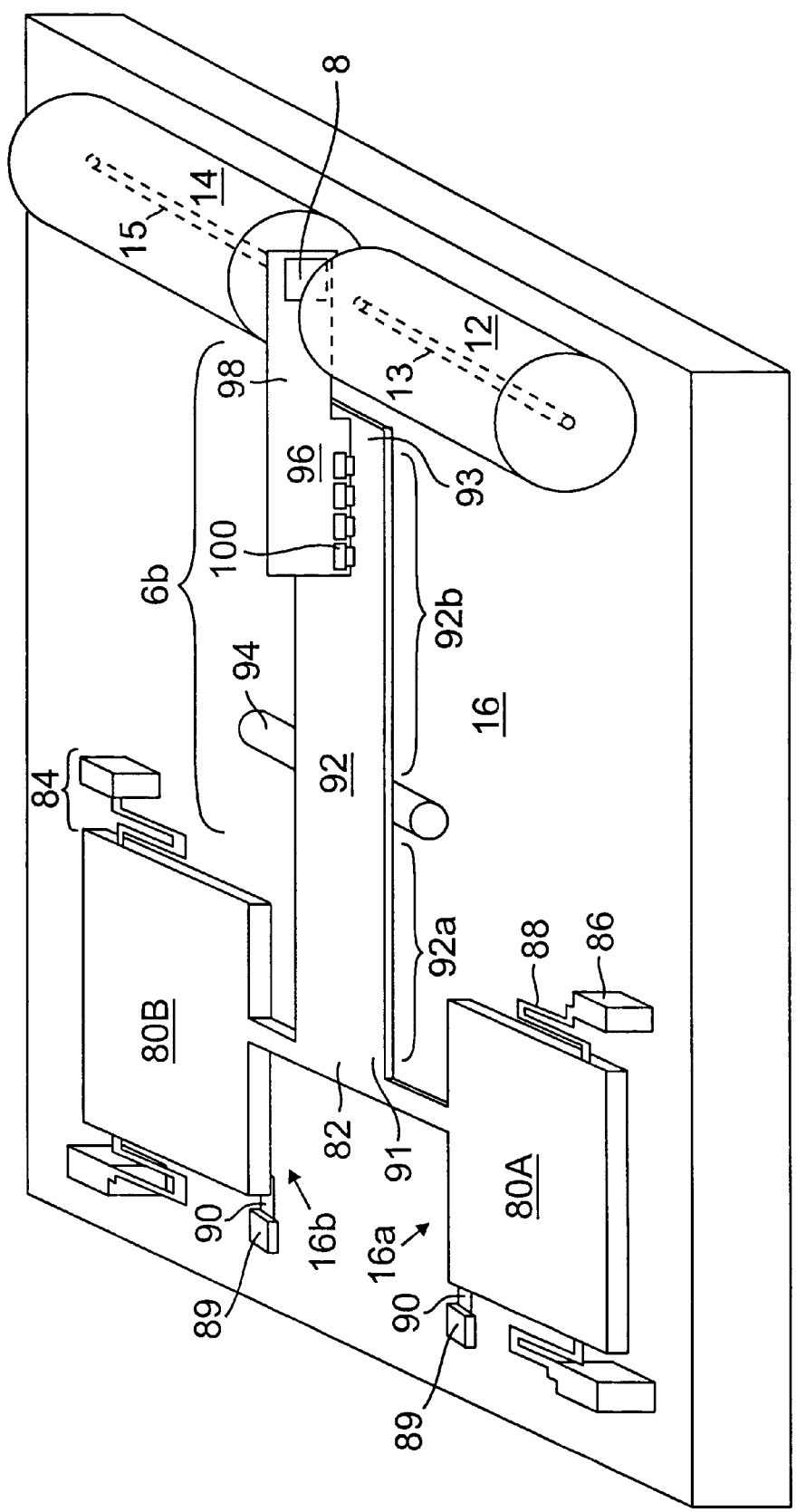
FIG. 7 shows an exemplary embodiment of an actuator suitable for actuating the out-of-plane optical switch of FIG. 6.

FIG. 7 shows an exemplary embodiment of the actuator 4b and an exemplary linkage 6b that interconnects the actuator to the optical device 8. The exemplary actuator 4b includes two plate electrodes 80a, 80b, suspended over support 16 by four electrode supports 84. The plate electrodes 80a, 80b are interconnected by a bar 82. In other embodiments, more or less than two plate electrodes can be used.

In one embodiment, each electrode support 84 consists of a conductive flexible member or spring 88 and a spring support 86. The electrode supports 84 serve the dual function of supporting the plate electrodes 80a, 80b above the support 16, as well as providing electrical connection to the plate electrodes. The spring support 86 is electrically connected to a controlled voltage source, not shown. It should be understood that more or less than the four electrode supports 84 shown, and having other configurations suitable for achieving the afore-described functions, as will occur to skilled practioners, may suitably be used to the support the plate electrodes 80a, 80b.

Preferably, an insulating layer is disposed on the support 16 except in the regions 16a, 16b located beneath respective plate electrodes 80a, 80b. Alternatively, a conductive material can be disposed on top of the insulating layer at the regions 16a, 16b. The conductive portions 16a, 16b are electrically connected to the controlled voltage source via pads 89 and wire traces 90. The plate electrodes 80a, 80b are suitably spaced from respective conductive regions 16a, 16b located thereunder so that upon application of a voltage via the controlled voltage source, an electrostatic attraction is developed between the plate electrodes and the underlying conductive regions sufficient to cause the plate electrodes 80a, 80b to move downwardly towards the support 16. The springs 88 deform as necessary to allow the plate electrodes to move from their unbiased, quiescent position.

In the exemplary embodiment shown in FIG. 7, the linkage 6b consists of a beam 92 disposed on a pivot member 94. The pivot member 94 divides the beam into a first part 92a and a second part 92b. The beam 92 is attached, at beam end 91, to the bar 82. An optical device support 96 is attached to the beam 92 near beam end 93. In preferred embodiments, the support 96 is hinged to the beam 92 via hinges 100. The optical device support 96 includes a projection 98 upon which the optical device 8 is disposed. A support plate, not shown, similar to support plates 26 and 44 discussed in conjunction with the actuator 4a, can be attached to the beam 92. Such a support plate is used to support the optical device support 96 in an upright out-of-plane position as required for it to project between the optical fibers 12, 14. As noted previously in conjunction with the optical device support 68 of the optical switch 2a, glue can be used alone or in conjunction with the aforementioned plate support to fix the optical device support 96 in an upright position.

As previously described, when the actuator 4b is actuated, i.e., voltage is applied across the plate electrodes and the conductive regions 16a, 16b, the plates electrodes 80a, 80b move downwardly towards the conductive regions. As the plate electrodes move downwardly, the bar 82 depending therefrom drives the first part 92a of the beam 92 downwardly. Due to the presence of the pivot member 94, the second part 92b of the beam 92 moves upwardly as the first part 92a moves downwardly, in the manner of a "seesaw" or "teeter." By suitably selecting the distance between the pivot member 94 and optical device 8, the optical device is caused to move into, and out of, the optical path defined by fiber cores 13, 15 as a function of the oscillatory motion of the plate electrodes 80a, 80b.

In the embodiment pictured in FIG. 7, the optical device 8 moves out of the optical path as bias is applied. It will be appreciated that in other embodiments, the switch 2b can be configured so that the optical device 8 moves into the optical path when bias is applied. The plate electrodes 80a, 80b, hinges and various support plates comprising the optical switch 2b can be fabricated and assembled as described for the optical switch 2a.

Figure 8A:
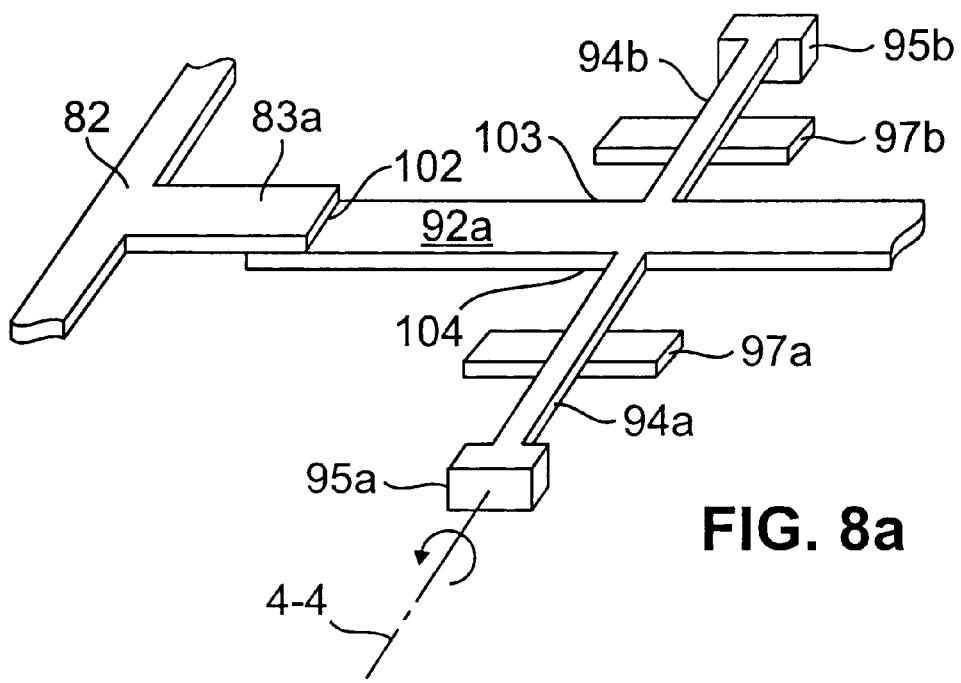
FIGS. 8a–c show alternate exemplary embodiments of a linkage and pivot member.
Figure 8B:
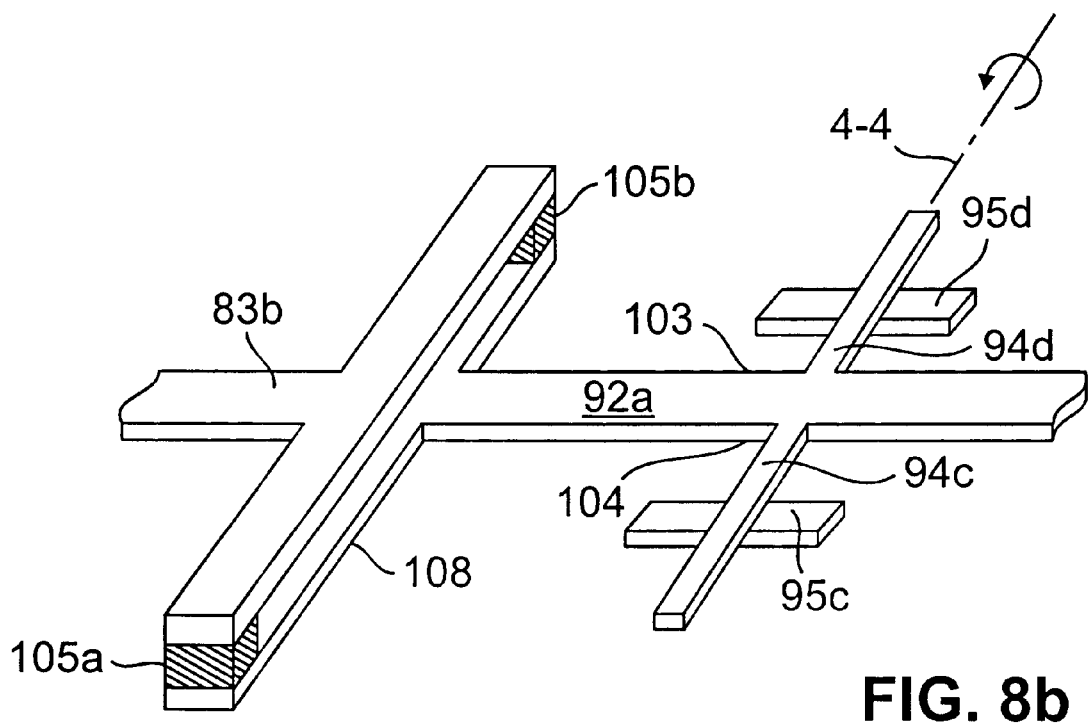
Figure 8C:
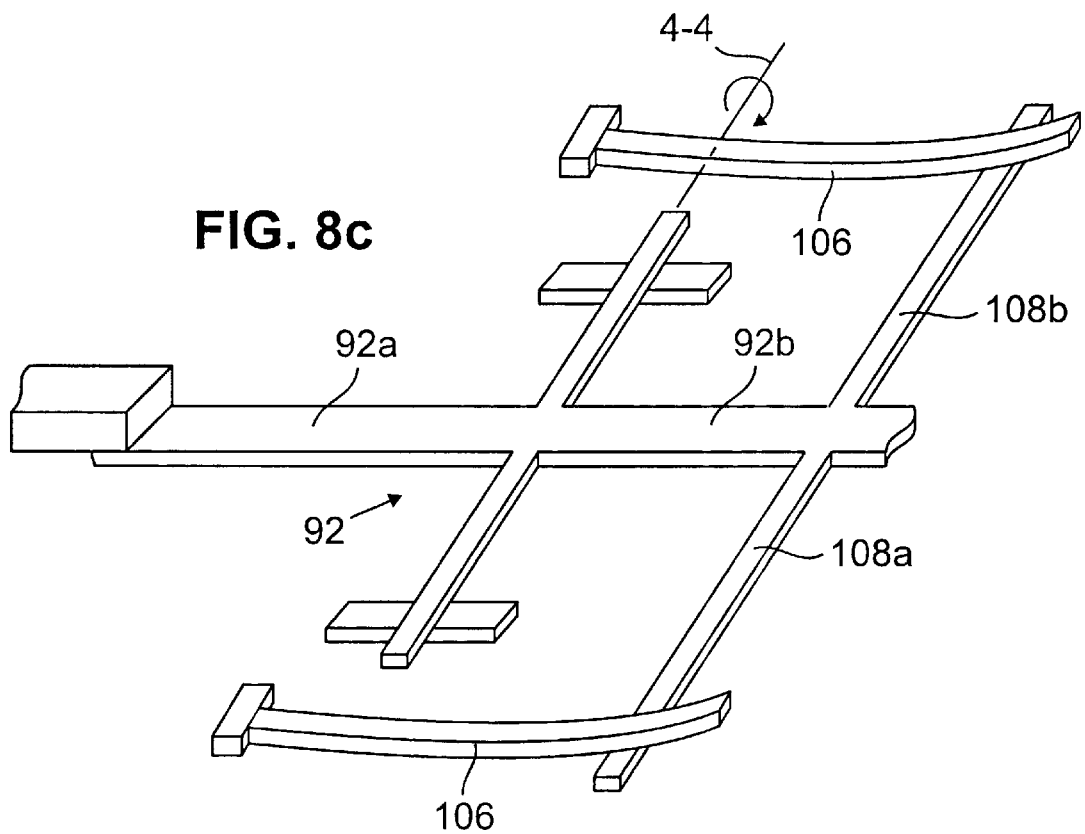

FIGS. 8a–c show alternative embodiments of the linkage 6b and pivot member 94. In FIG. 8a, the bar 82 has a projecting member 83a which rests on top of an upper surface 102 of the first part 92a of the beam 92. The pivot member 94 has arms 94a, 94b projecting from opposite edges 103, 104 of the beam 92 along axis 4—4. The arms 94a, 94b are supported by pads 95a, 95b. Extra support pads 97a, 97b can be used as required. As the plate electrodes 80a, 80b move downwardly, the bar 82 and projection 83 force the first part 92a of the beam 92 down. The beam 92 rotates about the axis 4—4 so that the second part 92b of the beam 92 rises as the first part 92a drops.

The embodiment illustrated in FIG. 8b includes a t-shaped projection 83b depending from the bar 82 that rests on top of a similarly t-shaped region 101 of the first part 92a of the beam 92. The t-shaped projection 83b is attached to the t-shaped region 101 near the edges 105a, 105b. Arms 94c, 94d depending from opposite edges 103, 104 of the beam 92 along axis 4—4. The arms 94c, 94d are supported by pads 95c, 95d. As in previous embodiments, the beam 92 rotates about the axis 4—4 as the first part 92a is driven downwardly.

The embodiment illustrated in FIG. 8c includes springs 106 operable to provide a restoring force to the beam 92 via spring receivers 108a, 108b when switching to an unactuated state from the actuated state. The springs 106 force the second part 92b of the beam 92 downwardly, which, due to rotation about axis 4—4 caused by the pivot member 94, causes the first part 92a of the beam 92 to rise to its unactuated or quiescent position.

In the foregoing embodiments, the exemplary optical switches were depicted as 1×1 switches, i.e., used in conjunction with two optical fibers. It is to be understood that optical switches according to the present invention can be implemented as 2×2 switches, as well. A simplified diagram of 2×2 switch operation is illustrated in FIGS. 9a and 9b.

Figure 9A:
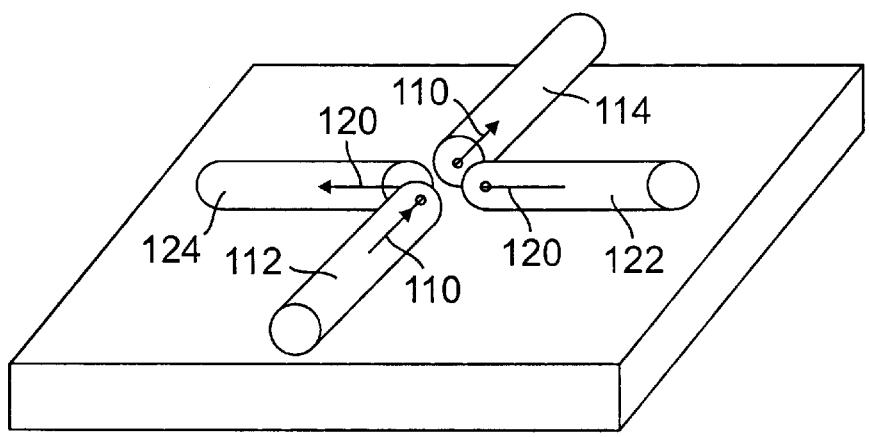
FIGS. 9a–9b illustrate a 2×2 optical switch according to the present invention.
Figure 9B:
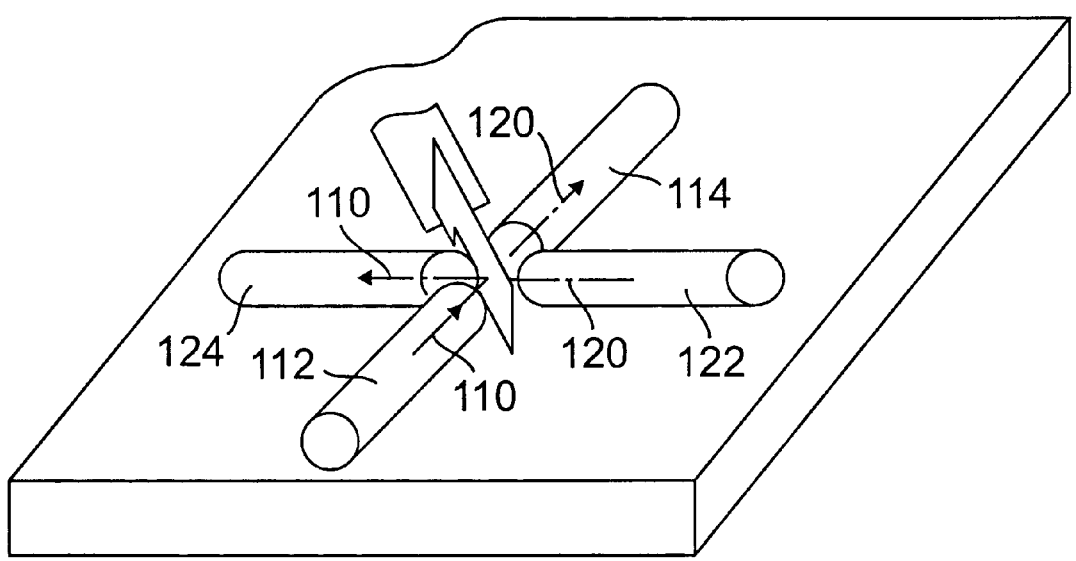

FIG. 9a shows the cross state wherein an optical signal 110 travels from optical fiber 112 to 114 and optical signal 120 travels from optical fiber 122 to 124. In the cross state, optical devices 8a, 8b, not pictured, are not in the optical path. FIG. 9b shows the bar state wherein the optical signal 110 is not received by the fiber 114. Rather, travels the optical signal 110 is received by a first optical device 8a now interposed between the fibers. The first optical device 8a is disposed on one side of the optical device support 68, 96. For the purposes of illustration, the first optical device 8a is assumed to be a dielectric mirror. The optical signal 110 is reflected from the optical device 8a to the fiber 124. For a 2×2 switch, a second optical device 8b is disposed on a second side of the optical device support 68, 96. The optical signal 120 is received from fiber 122 by optical device 8b and reflected to the fiber 114.

Thus, to implement the exemplary optical switches 2a, 2b as 2×2 switches, the linkage 6a, 6b is positioned at a 45° angle to the fibers, rather than perpendicular to them as in the aforedescribed 1×1 switches. As described, for use as a 2×2 switch, an optical device is accessible from either face of the optical device support. Moreover, it will be appreciated for the case of an in-plane (switch 2a) 2×2 switch, the optical device 8 must move through a greater horizontal distance when moving into and out of the optical path. Thus, greater movement of the movable electrode 30, relative to a 1×1 implementation, must be provided for.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

We claim:

1. An optical switch comprising:
   an electromechanical actuator comprising an electrically conductive micro machined plate movable in a reciprocating manner towards and away from a non-moving electrically conductive surface;
   an optical device for affecting an optical signal traveling along an optical path; and
   a linkage that mechanically connects the movable plate to the optical device; wherein,
   the linkage, through the reciprocating action of the movable plate, is operable to move the optical device between a first position out of the optical path and a second position in the optical path.

2. The optical switch of claim 1 further comprising a support having a first surface upon which the actuator is disposed.

3. The optical switch of claim 2 further comprising two waveguides for supporting propagation of the optical signal, the two waveguides are spaced to provide the optical device access to the optical signal.

4. The optical switch of claim 2 wherein the movable plate and the non-moving surface are out-of-plane relative to the first surface of the support.

5. The optical switch of claim 4 wherein the direction of the reciprocating movement of the movable plate is in-plane relative to the first surface of the support.

6. The optical switch of claim 5 wherein the movable plate comprises a frame, and a plate having a first end and a second end, wherein, the plate is engaged at its first end to the frame, the engagement allowing the plate to rotate about the axis of engagement.

7. The optical switch of claim 6 wherein the linkage is connected to the second end of the plate and has a out-of-plane motion decoupler.

8. The optical switch of claim 6 wherein the frame and non-moving surface are rotably attached to the first surface of the support so that they can be rotated from a first position wherein the non-moving surface and the frame are lying on the first surface of the support, to a second position wherein they are substantially perpendicular to a plane defined by the first surface of the support.

9. The optical switch of claim 7, and further comprising an optical device support upon which the optical device is disposed, wherein the optical device support is attached to the linkage and is physically adapted to place the optical device in a first gap between a first and a second waveguides that support the optical signal.

10. The optical switch of claim 9, and further wherein the optical device is operable to affect a second optical signal that is supported by a third and a fourth waveguides, and wherein the optical device support is physically adapted to place the optical device in a second gap between the first, second, third and fourth waveguides.

11. The optical switch of claim 2 wherein the movable plate is suspended above the non-moving surface.

12. The optical switch of claim 10 wherein the direction of the reciprocating movement of the movable plate is out-of-plane relative to the first surface of the support.

13. The optical switch of claim 12 wherein the linkage has a pivot point that divides the linkage into a first portion and a second portion, wherein, the pivot point is operable to reverse the direction of motion of the second portion of the linkage relative to the direction of motion of the first portion of the linkage.

14. The optical switch of claim 13, and further comprising an optical device support upon which the optical device is disposed, wherein the optical device support is attached to the linkage and is physically adapted to place the optical device in a gap between a first and a second waveguides that support the optical signal.

15. The optical switch of claim 13, and further wherein the optical device is operable to affect a second optical signal that is supported by a third and a fourth waveguides, and wherein the optical device support is physically adapted to place the optical device in a second gap between the first, second, third and fourth waveguides.

16. A electromechanical actuator operable to impart in-plane motion to a device to be actuated, comprising:

a fixed electrically conductive plate;

a movable electrically conductive plate attached by hinges to a frame, wherein the hinges allow the movable plate to rotate about an axis of attachment;

hinges for attaching the fixed plate and the movable plate to an actuator support, the hinges operable to allow the fixed and movable plates to be rotated from a first in-plane position wherein the plates are lying on the actuator support, to a second out-of-plane position wherein the plates are substantially perpendicular to the actuator support; and a linkage for mechanically attaching the movable plate to the device to be actuated; wherein, the fixed and movable plates are suitably spaced to support an electrostatic charge therebetween operable to cause the movable plate to move towards the fixed plate in a direction substantially parallel to the actuator support upon application of a voltage, the movement of the movable plate causing the linkage to move and, in turn, moving the device to be actuated from a first unactuated position to a second actuated position.

17. The actuator of claim 16 and further wherein the linkage has a hinge that segments the linkage into a first portion and a second portion, wherein the hinge isolates the second portion from any out-of-plane forces delivered to the first portion by the movable plate.

18. The actuator of claim 17 and further comprising a device support for supporting the device to be actuated, wherein the device support is attached to the linkage by a hinge operable to allow the device support to be rotated from a first in-plane position wherein the device support is lying on the linkage, to a second out-of-plane position wherein the device support is substantially perpendicular to the actuator support.

19. A electromechanical actuator operable to impart out-of-plane motion to a device to be actuated, comprising:

a non-moving conductive surface;

a movable electrically conductive plate supported over the nonmoving surface by a plate support having a flexible member that allows the movable plate to move in an out-of-plane direction relative to the nonmoving surface; and a linkage for mechanically attaching the movable plate to the device to be actuated, the linkage having a pivot point segmenting the linkage into a first portion and a second portion, wherein, the first portion of the linkage has the same direction of motion as the movable plate, and the second portion of the linkage has a direction of motion that is opposite that of the movable plate; wherein, the nonmoving surface and movable plate are suitably spaced to support an electrostatic charge therebetween operable to cause the movable plate to move towards the nonmoving surface in a direction substantially perpendicular to the actuator support upon application of a voltage, the movement of the movable plate causing the linkage to move and, in turn, moving the device to be actuated from a first unactuated position to a second actuated position.

20. The actuator of claim 19 and further comprising a device support for supporting the device to be actuated, wherein the device support is attached to the linkage by a hinge operable to allow the device support to be rotated from a first in-plane position wherein the device support is lying on the linkage, to a second out-of-plane position wherein the device support is substantially perpendicular to the actuator support.

* * * * *